US008493191B2

(12) United States Patent
Flick

(10) Patent No.: US 8,493,191 B2
(45) Date of Patent: Jul. 23, 2013

(54) VEHICLE SECURITY NOTIFICATION DEVICE AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 927 days.

(21) Appl. No.: 12/037,643

(22) Filed: Feb. 26, 2008

(65) Prior Publication Data

US 2009/0212927 A1 Aug. 27, 2009

(51) Int. Cl.
*B60R 25/10* (2006.01)

(52) U.S. Cl.
USPC ........... 340/426.1; 340/425.5; 340/426.13; 340/426.15; 340/426.18; 340/426.34; 340/438; 340/441; 340/474; 340/936; 180/170; 180/271; 180/286; 307/10.1; 307/10.2

(58) Field of Classification Search
USPC .............. 340/426.1, 425.5, 5.21, 5.64, 426.11–426.36, 5.33, 5.6, 438, 441, 474, 340/933, 936; 701/213–216, 1, 2, 9, 93, 400, 701/408; 307/10.1–10.5; 342/357.06–357.15; 180/287–289, 170, 271, 286
See application file for complete search history.

(56) References Cited

U.S. PATENT DOCUMENTS

| | | | |
|---|---|---|---|
| 3,949,300 A | 4/1976 | Sadler | 325/31 |
| 4,296,496 A | 10/1981 | Sadler | 455/1 |
| 5,371,802 A * | 12/1994 | McDonald et al. | 381/71.4 |
| 5,635,921 A | 6/1997 | Maxwell et al. | 340/902 |
| 5,635,923 A | 6/1997 | Steele et al. | 340/905 |
| 5,794,164 A * | 8/1998 | Beckert et al. | 455/3.06 |
| 5,819,198 A * | 10/1998 | Peretz | 701/117 |
| 5,844,505 A | 12/1998 | Van Ryzin | 340/988 |
| 5,889,475 A | 3/1999 | Klosinski et al. | 340/902 |
| 5,900,823 A * | 5/1999 | Coll-Cuchi | 340/5.64 |
| 5,926,086 A | 7/1999 | Escareno et al. | 340/426 |
| 6,175,789 B1 * | 1/2001 | Beckert et al. | 701/33 |
| 6,804,490 B2 | 10/2004 | Cook et al. | 455/3.01 |
| 6,900,723 B2 | 5/2005 | Yamanaka et al. | 340/426.1 |
| 7,098,804 B2 | 8/2006 | Tringali et al. | 340/902 |
| 7,190,262 B1 | 3/2007 | Edmondson | 340/539.1 |
| 7,224,261 B2 | 5/2007 | Shimomura | 340/426.11 |
| 2001/0032236 A1 * | 10/2001 | Lin | 709/203 |
| 2004/0135670 A1 * | 7/2004 | Guba | 340/5.21 |
| 2005/0232469 A1 * | 10/2005 | Schofield et al. | 382/104 |

(Continued)

OTHER PUBLICATIONS

U.S. Appl. No. 11/844,683, filed Aug. 24, 2007, Flick.

(Continued)

*Primary Examiner* — Steven Lim
*Assistant Examiner* — Sisay Yacob
(74) *Attorney, Agent, or Firm* — Allen, Dyer, Doppelt, Milbrath & Gilchrist, P.A.

(57) ABSTRACT

A vehicle security device to be installed in a vehicle of a type including a vehicle audio entertainment system being configurable via a vehicle data communications bus extending throughout the vehicle may include an audio entertainment system content interface. The audio interface may be selectively operable to communicate audio content relating to a vehicle security breach condition to the vehicle audio entertainment system. The device may also include a controller coupled to the audio entertainment system content interface for detecting a vehicle security breach condition. The controller may also be for configuring the vehicle audio entertainment system, via the vehicle data communications bus, so that the audio content related to the vehicle security breach condition plays through the vehicle audio entertainment system based upon detecting the vehicle security breach condition.

22 Claims, 2 Drawing Sheets

U.S. PATENT DOCUMENTS

| | | | |
|---|---|---|---|
| 2006/0028323 A1 | 2/2006 | Ohno et al. | 340/425.5 |
| 2006/0111827 A1 | 5/2006 | Russlies et al. | 701/49 |
| 2007/0236342 A1 | 10/2007 | Hines et al. | 340/438 |
| 2008/0273715 A1* | 11/2008 | Snider et al. | 381/86 |

OTHER PUBLICATIONS

U.S. Appl. No. 11/844,648, filed Aug. 24, 2007, Flick.
U.S. Appl. No. 12/037,670, filed Feb. 26, 2008, Flick.

* cited by examiner

VEHICLE SECURITY NOTIFICATION DEVICE AND RELATED METHODS

FIELD OF THE INVENTION

The present invention relates to the field of vehicle devices, and, more particularly, to a vehicle audio system interfacing device, and related methods.

BACKGROUND OF THE INVENTION

A vehicle event detection system is typically used to notify a person of a given vehicle condition. For example, a vehicle condition detection system may be a vehicle alarm system that deters vehicle theft, prevents theft of valuables from a vehicle, deters vandalism, and protects vehicle owners and occupants. A typical vehicle event detection system, for example, includes a central processor or controller connected to vehicle sensors. The sensor, for example, may detect opening of the trunk, hood, doors, windows, and also movement of the vehicle or within the vehicle. An ultrasonic and microwave motion detector, a vibration sensor, a sound discriminator, a differential pressure sensor, a speed detector, and a switch may be used as a sensor. In addition, a radar sensor may be used to monitor the area proximate the vehicle.

The controller typically operates to give an indication in the event of triggering of a vehicle sensor. The indication may typically be a flashing of the lights, an interior visual indicator, an interior audible indicator, and/or the sounding of the vehicle horn or a siren. In addition, the vehicle fuel supply and/or ignition power may be selectively disabled based upon a condition.

The indication provided at the vehicle is important to the overall effectiveness of the event detection system. For example, a weak alarm indication may do little to deter a would-be thief or notify a person of a potential hazard or dangerous vehicle condition. A thief may also be more likely to target a vehicle when the vehicle is among hundreds of vehicles in a large parking lot, for example. In such a situation, the thief may be comforted in knowing that the alarm indication will be ignored by bystanders, since many audible alarm indications are generic. Moreover, once inside the vehicle, the thief may disable the alarm and drive away.

U.S. Pat. No. 6,900,723 to Yamanaka et al. discloses an anti-theft system for vehicles. Positional information is sent to an anti-theft service center upon receiving a theft signal. Audible warnings in the form of voices are sent to the in-vehicle audio system. However, interfacing a security system audible warning to a vehicle entertainment or sound system may be complicated, and may void a manufacturer's warranty.

SUMMARY OF THE INVENTION

In view of the foregoing background, it is therefore an object of the present invention to provide notification of a vehicle security breach condition via the vehicle's audio system using a device readily interfaced with the vehicle audio entertainment system.

This and other objects, features, and advantages in accordance with the present invention are provided by a vehicle security device to be installed in a vehicle of a type including a vehicle audio entertainment system being configurable via a vehicle data communications bus extending throughout the vehicle. The vehicle security device may include an audio entertainment system content interface being selectively operable to communicate audio content relating to a vehicle security breach condition to the vehicle audio entertainment system. The vehicle security device may also include a controller coupled to the audio entertainment system content interface for detecting a vehicle security breach condition and configuring the vehicle audio entertainment system via the vehicle data communications bus so that the audio content related to the vehicle security breach condition plays through the vehicle audio entertainment system based upon detecting the vehicle security breach condition. Accordingly, the vehicle security device may provide notification of a vehicle security breach condition via the vehicle's audio system, and that may be readily interfaced to the vehicle audio entertainment system.

The audio entertainment system content interface may include a wireless transmitter that is selectively operable to communicate via a wireless link with the vehicle audio entertainment system. The wireless transmitter may operate at a predetermined frequency, such as an unused FM frequency, for example. Alternatively, the audio entertainment system content interface may include an output that is selectively operable to communicate via a wired link with the vehicle audio entertainment system.

A memory may be coupled to the audio entertainment system content interface for storing the audio content related to the vehicle security breach condition. In other embodiments, a receiver may be coupled to the audio entertainment system content interface for receiving the audio content related to the vehicle security breach condition from a remote location, for example.

Also, the vehicle security device may include a vehicle security sensor. The controller may detect the vehicle security breach condition based upon the vehicle security sensor. The vehicle security device may further include a position determining device, and the controller may detect the vehicle security breach condition based upon the position determining device. The position determining device may include a global positioning system (GPS), for example. The audio content relating to the vehicle security breach condition may include a police siren to deter a thief, or a voice message, for example.

Additionally, the vehicle security device may further include a vehicle speed sensor. The audio vehicle entertainment system content interface may be selectively operable to communicate audio content relating to a vehicle speed exceeded condition to the vehicle audio entertainment system and the controller may further detect a vehicle speed exceeded condition based on the vehicle sensor. The controller may further configure the vehicle audio entertainment system via the vehicle data communications bus so that the audio content related to the vehicle speed exceeded condition plays through the vehicle audio entertainment system based on detecting the vehicle speed exceeded condition.

A method aspect is directed to communicating audio content relating to a vehicle security breach condition in a vehicle of a type including a vehicle audio entertainment system being configurable via a vehicle data communications bus extending throughout the vehicle. The method may include selectively operating an audio entertainment system content interface to communicate audio content relating to a vehicle security breach condition to the vehicle audio entertainment system.

The method may further include using a controller coupled to the audio entertainment system content interface for detecting a vehicle security breach condition. The controller may configure the vehicle audio entertainment system via the vehicle data communications bus so that the audio content related to the vehicle security breach condition plays through the vehicle audio entertainment system based upon detecting the vehicle security breach condition.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
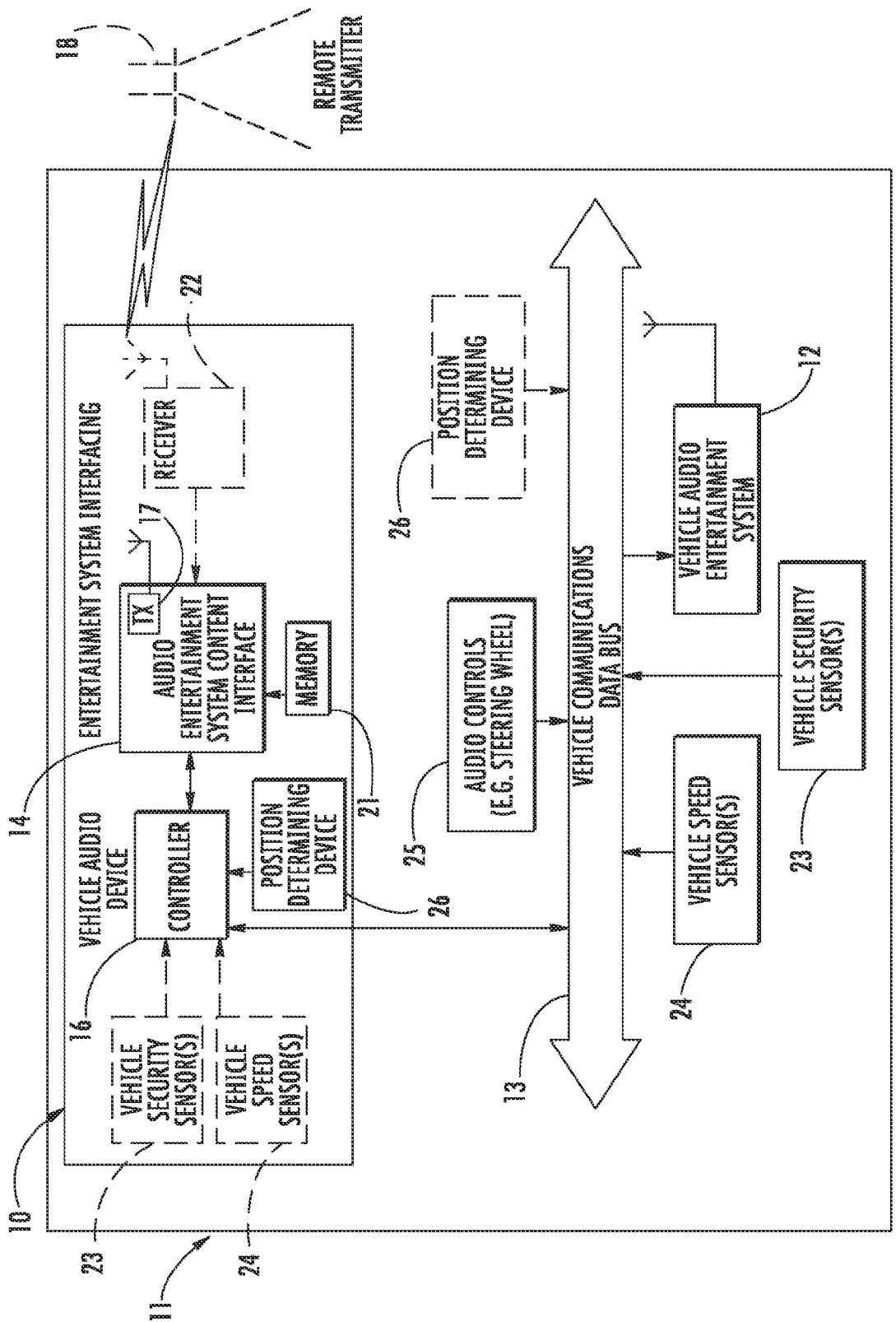
FIG. 1 is a schematic block diagram of a vehicle notification device in accordance with the present invention.

Referring initially to FIG. 1, a vehicle device 10 is installed in a vehicle 11 of a type including a vehicle audio entertainment system 12 being configurable via a vehicle data communications bus 13 extending throughout the vehicle. The vehicle device 10 includes an audio entertainment system content interface 14. The audio entertainment content interface 14 is selectively operable to communicate audio content relating to a vehicle condition to the vehicle audio entertainment system 12.

More particularly, the controller 16 cooperates with the audio entertainment system content interface 14 for detecting a vehicle speed exceeded condition, or a combination of conditions, and configuring the vehicle audio entertainment system 12 via the vehicle data communications bus 13. The vehicle condition may be advantageously detected by a sensor or device coupled to the controller 16 or coupled to the vehicle data communications bus 13, for example. Upon detecting the vehicle speed exceeded condition, the audio content related to the vehicle speed exceeded condition plays through the vehicle audio entertainment system 12.

The audio entertainment system content interface 14 illustratively includes a wireless transmitter 17 that communicates via a wireless link with the vehicle audio entertainment system 12. The wireless transmitter frequency may be in the AM or FM bands, and be received by the vehicle's conventional AM/FM vehicle antenna, for example. Still further, the wireless transmitter 17 may include a Bluetooth transmitter operating in accordance with the Bluetooth protocol, and link to a Bluetooth receiver coupled to the vehicle audio entertainment system 12. Other wireless links operating on short-range transmitters and respective receivers coupled to the vehicle audio entertainment system 12 may be used, as will be appreciated by those skilled in the art.

The controller 16 configures the vehicle audio entertainment system 12 via the vehicle data communications bus 13 to operate via the wireless transmitter 17 of the audio entertainment system content interface 14. The controller 16 operates similarly to conventional steering wheel audio entertainment system controls that generate data bus codes to configure the vehicle audio entertainment system 12, such as to select an FM radio tuner input and/or set a volume level.

In some embodiments, the wireless transmitter 17 may operate at a predetermined frequency, such as an unused radio frequency, for example. Accordingly, the controller 16 further configures the vehicle audio entertainment system 12 via the vehicle communications data bus 13 to operate at the predetermined frequency. For example, the controller 16 may configure the vehicle audio entertainment system 12 to receive at 88.3 MHz from the wireless transmitter 17 regardless of prior configuration of the vehicle audio entertainment system. Other frequencies in the FM and other bands may be used as will be appreciated by those having skill in the art.

The vehicle device 10 includes an optional memory 21 illustratively coupled to the audio entertainment system content interface 14 for storing the audio content related to the vehicle condition. In other embodiments, the vehicle device 10 includes a receiver 22 coupled to the audio entertainment system content interface 14 for receiving the audio content related to the vehicle speed exceeded condition from a remote location. The receiver 22 may be a cellular receiver or part of a cellular telephone communicating over a cellular network 18, for example, or may communicate via satellite or other communications links, as will be appreciated by those skilled in the art.

The vehicle may include a vehicle speed sensor 24. The vehicle speed sensor 24, in some embodiments, may be coupled to the controller 16 via the vehicle data communications bus 13 to determine whether the vehicle 11 has exceeded a speed threshold. In other embodiments, the vehicle speed sensing may be provided by the position determining device 26.

The audio content relating that the vehicle 11 has exceeded the speed threshold may be a voice message. The voice can advantageously be an authority figure, such as a parent, for example, relaying a scolding message. Additionally, the audio content may be a loud and irritating noise, or siren, that would cause a driver to reduce the vehicle speed below the threshold. If the vehicle 11 is not brought under the speed threshold after the audio content is played through the vehicle audio entertainment system 12, a speeding alert may be sent via the receiver 22 or a cell phone, for example.

Figure 2:
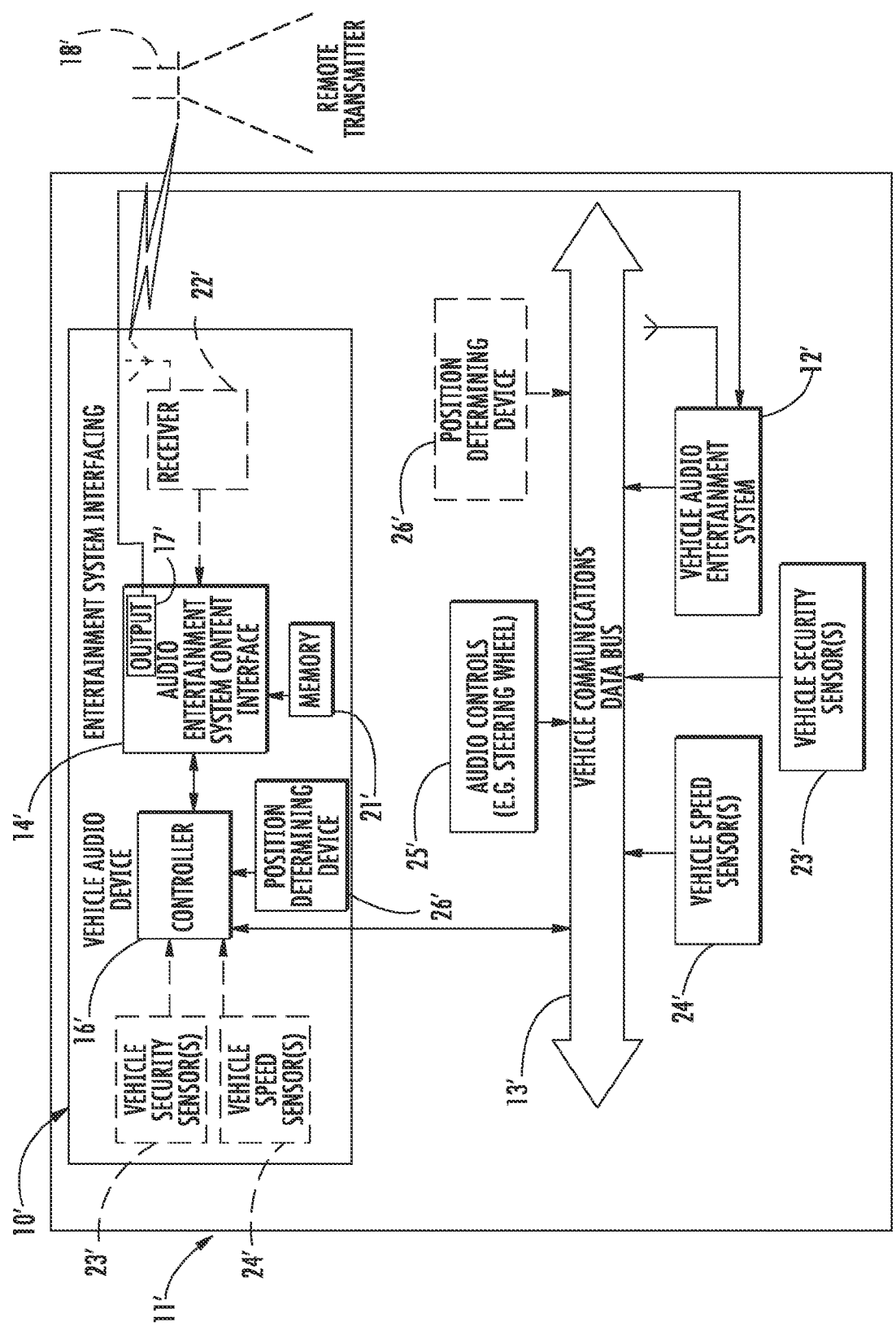
FIG. 2 is a schematic block diagram of another embodiment of a vehicle notification device in accordance with the present invention.

Referring now to FIG. 2, another embodiment of the vehicle device 10' is illustrated. The audio entertainment system content interface 14' is selectively operable to communicate via a wired output 17' with the vehicle audio entertainment system 12'. The controller 16' configures the vehicle audio entertainment system 12' to operate via the wired output 17' of the audio entertainment system content interface. A wired output 17', for example, may be an output port wired to an auxiliary input to the vehicle audio entertainment system 12', or similar output that will be appreciated by those skilled in the art.

Returning again to FIG. 1, the concepts related to a vehicle speed exceeded condition may be used together with a vehicle security breach condition. Alternatively, the vehicle security breach condition may be used by itself. At least one vehicle security sensor 23 is illustratively coupled to the controller 16. A position determining device 26 is also illustratively coupled to the controller 16. The position determining device 26 may be a global positioning system (GPS), for example. The data from the GPS may be used to determine a vehicle security breach condition that is related to the vehicle position. The data from the GPS may be used to determine other vehicle conditions, such as speeding, as will be appreciated by those skilled in the art. In other words, the GPS may be considered as a vehicle speed sensor. The position determining device 26 may be coupled to the receiver 22 as part of a GPS tracking system, for example. Still, other sensors coupled to the vehicle communications data bus 13 or the controller 16 may be used to determine a vehicle security breach condition.

The audio content relating to the vehicle security breach condition may include a police siren. The audio content may also be a voice message, or other loud and irritating noises, as will be appreciated by those skilled in the art. The volume of the police siren over the vehicle audio entertainment system 12 may progressively increase with time to potentially deceive the thief into believing he is being pursued by the police, and the police are closing in on the thief. Similarly, the voice message may advantageously convey messages to deter the thief, for example, a voice message stating the police have been called and have been notified of the vehicle's whereabouts.

Additionally, in the event of a vehicle security breach condition, the controller 16 may advantageously disable engine starting, or shut down the engine when the thief stops to investigate the sound from the vehicle audio entertainment system 12. Moreover, the controller 16 may disable or control other vehicle systems via the vehicle communications data bus 13, as will be appreciated by those skilled in the art. A vehicle theft alert may be sent via the receiver 22 or a cell phone, for example, after the audio content has been played through the vehicle audio entertainment system 12.

Still further, the controller 16 may advantageously detect when a driver or thief, for example, attempts to change the vehicle audio entertainment system 12 frequency or volume, as set by the controller 16. The controller 16 may send a code over the vehicle data bus 13 to return to the frequency and volume previously set by the controller to relate to the audio content. The controller 16 may override the driver's commands or lockout changing the setting established by the controller.

The embodiment in FIG. 2 can similarly be implemented using the concepts related to a vehicle speed exceeded condition and/or a security breach condition.

A method aspect is directed to communicating audio content relating to a vehicle condition in a vehicle 11 of a type including a vehicle audio entertainment system 12 being configurable via a vehicle data communications bus 13 extending throughout the vehicle. The method includes selectively operating an audio entertainment system content interface 14 to communicate audio content relating to a vehicle condition to the vehicle audio entertainment system 12.

The method also includes using a controller 16 coupled to the audio entertainment system content interface 14 for detecting a vehicle condition. The controller 16 further cooperates with the audio entertainment system content interface 14 for configuring the vehicle audio entertainment system 12 via the vehicle data communications bus 13 so that the audio content related to the vehicle condition plays through the vehicle audio entertainment system 12 based upon detecting the vehicle condition. The vehicle condition may be a vehicle security breach condition, or a vehicle speed exceeded condition, other condition, or a combination of conditions, as will appreciated by those skilled in the art.

Other features are described in co-pending applications entitled VEHICLE SPEED EXCEEDED NOTIFICATION DEVICE AND RELATED METHODS, Ser. No. 12/037,670 filed on Feb. 26, 2008; SPEED EXCEEDED NOTIFICATION DEVICE FOR VEHICLE HAVING A DATA BUS AND ASSOCIATED METHODS, Ser. No. 11/844,648 filed on Aug. 24, 2007; and VEHICLE DEVICE TO ACTIVATE A VISUAL OR AUDIBLE ALERT AND ASSOCIATED METHODS, Ser. No. 11/844,683 filed on Aug. 24, 2007, all of which are assigned to the present assignee, the entire disclosure of each is incorporated herein by reference. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A vehicle security device to be installed in a vehicle of a type comprising a vehicle audio entertainment system being configurable via a vehicle data communications bus extending throughout the vehicle, the vehicle device comprising:

an audio entertainment system content interface comprising a wireless transmitter that is selectively operable to communicate audio content relating to a vehicle security breach condition to the vehicle audio entertainment system via a wireless link at a given frequency with the vehicle audio entertainment system;

a controller coupled to said audio entertainment system content interface for
detecting a vehicle security breach condition,
configuring the vehicle audio entertainment system via the vehicle data communications bus to receive at the given frequency via the wireless link so that the audio content related to the vehicle security breach condition plays through the vehicle audio entertainment system based upon detecting the vehicle security breach condition, and
configuring the vehicle audio entertainment system via the vehicle data communications bus to maintain receiving at the given frequency irrespective of attempts to change the audio content played through the vehicle audio entertainment system; and a memory coupled to said audio entertainment system content interface for storing the audio content related to the vehicle security breach condition.

2. The vehicle security device according to claim 1 further comprising a receiver coupled to said audio entertainment system content interface for receiving the audio content related to the vehicle security breach condition from a remote location.

3. The vehicle security device according to claim 1 further comprising at least one vehicle security sensor; and wherein said controller detects the vehicle security breach condition based on the vehicle security sensor.

4. The vehicle security device according to claim 1 further comprising a position determining device; and wherein said controller detects the vehicle security breach condition based on the position determining device.

5. The vehicle security device according to claim 1 further comprising a vehicle speed sensor; wherein said audio vehicle entertainment system content interface is selectively operable to communicate audio content relating to a vehicle speed exceeded condition to the vehicle audio entertainment system; wherein said controller further detects a vehicle speed exceeded condition based on said vehicle sensor and configures the vehicle audio entertainment system via the vehicle data communications bus so that the audio content related to the vehicle speed exceeded condition plays through the vehicle audio entertainment system based on detecting the one vehicle speed exceeded condition; and wherein said memory is for storing the audio content relating to the vehicle security breach condition.

6. A vehicle security device to be installed in a vehicle of a type comprising a vehicle audio entertainment system being configurable via a vehicle data communications bus extending throughout the vehicle, the vehicle security device comprising:

an audio entertainment system content interface comprising an output that is selectively operable to communicate audio content relating to a vehicle security breach condition via a given input of a wired link to the vehicle audio entertainment system; and a controller coupled to said audio entertainment system content interface for detecting a vehicle security breach condition, configuring the vehicle audio entertainment system via the vehicle data communications bus to operate via the wired link at the given input so that the audio content related to the vehicle security breach condition plays through the vehicle audio entertainment system based upon detecting the vehicle security breach condition, and configuring the vehicle audio entertainment system via the vehicle data communications bus to maintain receiving at the given input irrespective of attempts to change the audio content played through the vehicle audio entertainment system; and a memory coupled to said audio entertainment system content interface for storing the audio content related to the vehicle security breach condition.

7. The vehicle security device according to claim 6 further comprising a receiver coupled to said audio entertainment system content interface for receiving the audio content related to the vehicle security breach condition from a remote location.

8. The vehicle security device according to claim 6 further comprising a vehicle security sensor; and wherein said controller detects the vehicle security breach condition based upon the vehicle security sensor.

9. The vehicle security device according to claim 6 further comprising a position determining device; and wherein said controller detects the vehicle security breach condition based upon the position determining device.

10. The vehicle security device according to claim 6 further comprising a vehicle speed sensor; wherein said audio vehicle entertainment system content interface is selectively operable to communicate audio content relating to a vehicle speed exceeded condition to the vehicle audio entertainment system; wherein said controller further detects a vehicle speed exceeded condition based on said vehicle sensor and configures the vehicle audio entertainment system via the vehicle data communications bus so that the audio content related to the vehicle speed exceeded condition plays through the vehicle audio entertainment system based on detecting the vehicle speed exceeded condition; and wherein said memory is for storing the audio content relating to the vehicle security breach condition.

11. A method for communicating audio content relating to a vehicle security breach condition in a vehicle of a type comprising a vehicle audio entertainment system being configurable via a vehicle data communications bus extending throughout the vehicle, the method comprising:

selectively operating an audio entertainment system content interface comprising a wireless transmitter to communicate, via a wireless link at a given frequency, audio content relating to a vehicle security breach condition to the vehicle audio entertainment system; and using a controller coupled with the audio entertainment system content interface for detecting a vehicle security breach condition, configuring the vehicle audio entertainment system via the vehicle data communications bus to receive at the given frequency via the wireless link so that the audio content related to the vehicle security breach condition plays through the vehicle audio entertainment system based upon detecting the vehicle security breach condition, and configuring the vehicle audio entertainment system via the vehicle data communications bus to maintain receiving at the given frequency irrespective of attempts to change the audio content played through the vehicle audio entertainment system.

12. The method according to claim 11 further comprising storing the audio content related to the vehicle security breach condition in a memory.

13. The method according to claim 11 further comprising receiving the audio content related to the vehicle security breach condition from a remote location.

14. The method according to claim 11 further comprising using the controller to detect the vehicle security breach condition based upon a vehicle security sensor.

15. The method according to claim 11 further comprising using the controller to detect the vehicle security breach condition based upon a position determining device.

16. The method according to claim 11 further comprising a vehicle speed sensor; wherein the audio vehicle entertainment system content interface is selectively operated to communicate audio content relating to a vehicle speed exceeded condition to the vehicle audio entertainment system; and wherein the controller further detects a vehicle speed exceeded condition based on the vehicle sensor and configures the vehicle audio entertainment system via the vehicle data communications bus so that the audio content related to the vehicle speed exceeded condition plays through the vehicle audio entertainment system based on detecting the vehicle speed exceeded condition.

17. A method for communicating audio content relating to a vehicle security breach condition in a vehicle of a type comprising a vehicle audio entertainment system being configurable via a vehicle data communications bus extending throughout the vehicle, the method comprising:

selectively operating an audio entertainment system content interface comprising an output to communicate, via a given input of a wired link, audio content relating to a vehicle security breach condition to the vehicle audio entertainment system; and using a controller coupled with the audio entertainment system content interface for detecting a vehicle security breach condition, configuring the vehicle audio entertainment system via the vehicle data communications bus to operate via the wired link at the given input so that the audio content related to the vehicle security breach condition plays through the vehicle audio entertainment system based upon detecting the vehicle security breach condition, and configuring the vehicle audio entertainment system via the vehicle data communications bus to maintain receiving at the given input irrespective of attempts to change the audio content played through the vehicle audio entertainment system.

18. The method according to claim 17 further comprising storing the audio content related to the vehicle security breach condition in a memory.

19. The method according to claim 17 further comprising receiving the audio content related to the vehicle security breach condition from a remote location.

20. The method according to claim 17 further comprising using the controller to detect the vehicle security breach condition based upon a vehicle security sensor.

21. The method according to claim 17 further comprising using the controller to detect the vehicle security breach condition based upon a position determining device.

22. The method according to claim 17 further comprising a vehicle speed sensor; wherein the audio vehicle entertainment system content interface is selectively operated to communicate audio content relating to a vehicle speed exceeded condition to the vehicle audio entertainment system; and wherein the controller further detects a vehicle speed exceeded condition based on the vehicle sensor and configures the vehicle audio entertainment system via the vehicle data communications bus so that the audio content related to the vehicle speed exceeded condition plays through the vehicle audio entertainment system based on detecting the vehicle speed exceeded condition.

* * * * *